US008909900B2

(12) United States Patent
Dolgunov et al.

(10) Patent No.: US 8,909,900 B2
(45) Date of Patent: Dec. 9, 2014

(54) STORAGE DEVICE AND METHOD FOR UPDATING DATA IN A PARTITION OF THE STORAGE DEVICE

(75) Inventors: Boris Dolgunov, Ramat-Gan (IL); Nir Ekhauz, Tzur Yitzhak (IL); Nir Paz, Kiryat Tivon (IL)

(73) Assignee: SanDisk IL Ltd., Kfar Saba (IL)

( * ) Notice: Subject to any disclaimer, the term of this patent is extended or adjusted under 35 U.S.C. 154(b) by 113 days.

(21) Appl. No.: 13/304,117

(22) Filed: Nov. 23, 2011

(65) Prior Publication Data

US 2012/0246442 A1 Sep. 27, 2012

Related U.S. Application Data

(63) Continuation of application No. PCT/IB2011/000917, filed on Apr. 28, 2011.

(60) Provisional application No. 61/466,725, filed on Mar. 23, 2011.

(51) Int. Cl.
*G06F 12/06* (2006.01)
*G06F 21/78* (2013.01)
*G06F 9/445* (2006.01)
*G06F 11/14* (2006.01)
*G06F 21/57* (2013.01)

(52) U.S. Cl.
CPC ...... *G06F 21/78* (2013.01); *G06F 8/67* (2013.01); *G06F 11/1415* (2013.01); *G06F 21/57* (2013.01)
USPC .................................. 711/209; 711/E12.078

(58) Field of Classification Search
None
See application file for complete search history.

(56) References Cited

U.S. PATENT DOCUMENTS

| 6,321,314 | B1 | 11/2001 | Van Dyke |
| 7,017,004 | B1 * | 3/2006 | Calligaro et al. ............ 711/102 |
| 7,320,009 | B1 * | 1/2008 | Srivastava et al. ............ 707/625 |
| 7,543,182 | B2 * | 6/2009 | Branda et al. ................... 714/15 |
| 7,822,979 | B2 | 10/2010 | Mittal |
| 2001/0011347 | A1 | 8/2001 | Narayanaswamy et al. |

(Continued)

FOREIGN PATENT DOCUMENTS

| EP | 2 096 538 A1 | 9/2009 |
| WO | WO 2008/135969 A1 | 11/2008 |

OTHER PUBLICATIONS

International Search Report and Written Opinion for PCT/IB2011/000917, dated Nov. 7, 2011, 11 pages.

*Primary Examiner* — Charles Rones
*Assistant Examiner* — Tian-Pong Chang
(74) *Attorney, Agent, or Firm* — Brinks Gilson & Lione

(57) ABSTRACT

A storage device and method for updating data stored in a partition of the storage device are provided. In one embodiment, a storage device is provided that contains a logical-to-physical address map and a memory with a first partition storing original data and a second partition. The storage device receives from a host device (i) a command to write updated data to a first logical address and (ii) a signature for verifying integrity of the updated data, wherein the first logical address is mapped to a physical address of the first partition. The storage device then stores the updated data in the second partition instead of the first partition and attempts to verify the signature of the updated data. If the attempt to verify the signature is successful, the storage device updates the logical-to-physical address map to map the first logical address to a physical address of the second partition.

26 Claims, 5 Drawing Sheets

(56) References Cited

U.S. PATENT DOCUMENTS

| | | |
|---|---|---|
| 2006/0031632 A1 | 2/2006 | Moran et al. |
| 2006/0174352 A1 | 8/2006 | Thibadeau |
| 2007/0266444 A1 | 11/2007 | Segal |
| 2010/0011350 A1 | 1/2010 | Zayas |
| 2012/0054734 A1* | 3/2012 | Andrews et al. .............. 717/171 |

* cited by examiner

STORAGE DEVICE AND METHOD FOR UPDATING DATA IN A PARTITION OF THE STORAGE DEVICE

CROSS-REFERENCE TO RELATED APPLICATION

This application is a continuation of PCT Application No. PCT/IB2011/000917, filed Apr. 28, 2011, which claims the benefit of U.S. Provisional Patent Application No. 61/466,725, filed Mar. 23, 2011, both of which are hereby incorporated by reference herein.

BACKGROUND

Some storage devices, such as some universal serial bus (USB) devices or memory cards, have sophisticated security systems that require a host device to run an application to enable it to communicate with the storage device using special application program interfaces (APIs). Since a host device may not be preloaded with such an application, the storage device can carry the application with it and provide it to the host device when the storage device is connected with the host device. The application is usually located in a partition that is separate from the public partition used to store user data and is uploaded to the host device before authentication. To protect the application from tampering, the application can be stored in a read-only partition in the storage device.

Because the application may become out of date, because security weaknesses may be found over time, and/or because new applications with extended features may be released, it is desired to provide a mechanism to update the application. One prior technique for such an update is shown in FIG. 5. In this technique, a server 500 establishes a secure channel 505 through the host device 510 to the storage device 520 and delivers the updated application through the secure channel 505 using encrypted and/or signed commands. The direct secure channel 505 between the server 500 and the storage device 520 is used because it is possible that the host device 510 and/or storage device 520 can be compromised and not trusted. While the use of a secure channel 505 protects the updated application from being tampered with, this technique requires the storage device 500 to be connected to the server 500 over a network during the entire update process. Further, the server 500 may need to encrypt and/or sign data using a different key for every storage device that is updated, which can add time and expense to the update process. This technique also may require the server 500 to have knowledge of the storage commands needed to store the updated application in the storage device 520, as the host device 510 merely acts as a proxy.

OVERVIEW

Embodiments of the present invention are defined by the claims, and nothing in this section should be taken as a limitation on those claims.

By way of introduction, the below embodiments relate to a storage device and method for updating data stored in a partition of the storage device. In one embodiment, a storage device is provided that contains a logical-to-physical address map and a memory with a first partition storing original data and a second partition. The storage device receives from a host device (i) a command to write updated data to a first logical address and (ii) a signature for verifying integrity of the updated data, wherein the first logical address is mapped to a physical address of the first partition. The storage device then stores the updated data in the second partition instead of the first partition and attempts to verify the signature of the updated data. If the attempt to verify the signature is successful, the storage device updates the logical-to-physical address map to map the first logical address to a physical address of the second partition.

Other embodiments are possible, and each of the embodiments can be used alone or together in combination. Accordingly, various embodiments will now be described with reference to the attached drawings.

DETAILED DESCRIPTION OF THE PRESENTLY PREFERRED EMBODIMENTS

Introduction

In general, the below embodiments relate to a storage device and method for updating data in a partition of the storage device. This method can be used, for example, to update data stored in a partition without the need for a secure channel between the host device and the storage device. In one particular implementation, the data is an application that the storage device provides to the host device to allow the host device to communicate with the storage device. Before turning to this and other examples, an overview of exemplary host and storage devices is provided.

Exemplary Host and Storage Devices

Figure 1:
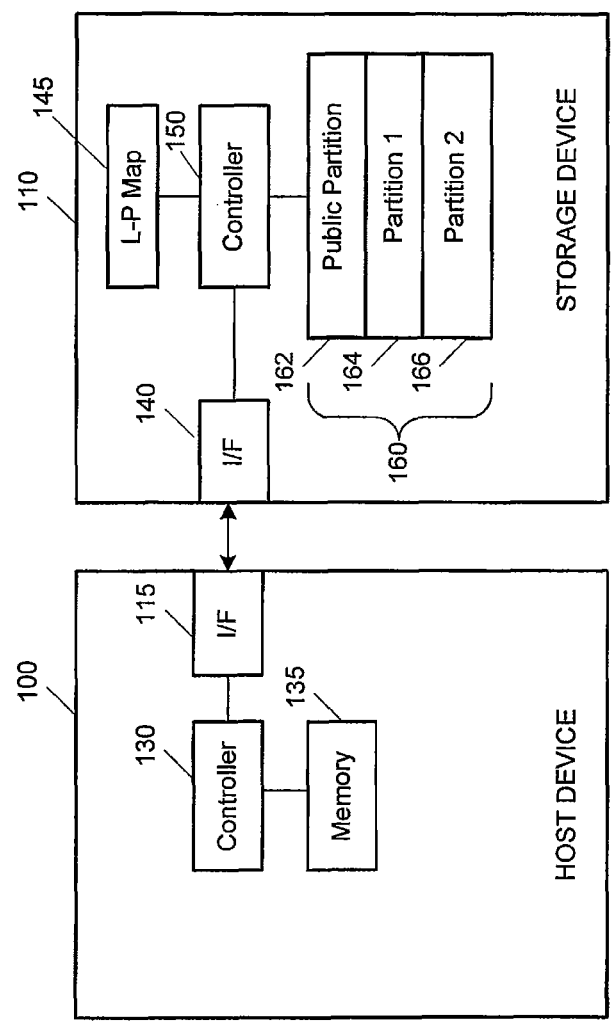
FIG. 1 is a block diagram of an exemplary host device and storage device of an embodiment.

Turning now to the drawings, FIG. 1 shows a host device 100 in communication with a storage device 110 via first and second interfaces 115, 140. As used herein, the phrase "in communication with" could mean directly in communication with or indirectly in communication with through one or more components, which may or may not be shown or described herein. For example, the interfaces 115, 140 can contain the physical and electrical connectors to send data and commands between the storage device 110 and the host device 100. FIG. 1 shows that the host device 100 comprises a controller 130 and a memory 135, although the host device 100 can contain additional elements, which are not shown in FIG. 1 to simply the drawing. A host device 100 can take any suitable form, such as, but not limited to, a personal computer (PC), a mobile phone, a digital media player, a game device, a personal digital assistant (PDA), a kiosk, a set-top box, a TV system, a book reader, or any combination thereof.

The storage device 110 can take any suitable form, such as, but not limited to, an embedded memory (e.g., a secure module embedded in the host device 100), a universal serial bus (USB) device, a smart card, a handheld, removable memory card, or a removable or non-removable hard drive, such as a solid-state drive, a serial advanced technology attachment (SATA) hard drive, etc. As shown in FIG. 1, the storage device 110 comprises the interface 140 to communicate with the host device 100, a logical-to-physical address map 145, a controller 150, and a memory 160. The storage device 110 can contain additional elements, which are not shown in FIG. 1 to simply the drawing.

The controller 150 can include, for example, a central processing unit (CPU), a crypto-engine operative to provide encryption and/or decryption operations, read access memory (RAM), and read only memory (ROM) for storing firmware for the basic operations of the storage device 110. The controller 150 can be implemented in any suitable manner. For example, the controller 150 can take the form of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example. Examples of controllers include, but are not limited to, the following microcontrollers: ARC 625D, Atmel AT91SAM, Microchip PIC18F26K20, and Silicon Labs C8051F320. The controller 150 can also be implemented as part of the memory control logic.

The storage device's memory 160 can take any suitable form, such as, but not limited to, a mass storage device with solid-state (e.g., flash) memory. In this embodiment, the memory 160 of the storage device 110 contains three areas or partitions: a public partition 162 for storing user data, a first partition 164, and a second partition 166. As will be discussed below, in some embodiments, the first and second partitions 164, 166 are read-only. The public memory area 162, the first partition 164, and the second partition 166 can all be part of the same physical memory device or can be part of separate physical memory devices.

Updating Data in a Partition of the Storage Device

As mentioned in the background section above, some storage devices store data (e.g., an application for use by a host device to communicate with the storage device) in a partition, and a secure channel between a server and the storage device is needed to securely deliver updated data to the storage device. While the use of a secure channel protects the updated data from being tampered with en route to the storage device, this technique requires the storage device to be connected to the server during the entire update process. Further, the server may need to encrypt and/or sign the updated data using a different key (a session key) for every storage device that is updated, which can add time and expense to the update process.

To overcome this problem, the following embodiments provide a method for updating data stored in a partition of a storage device without the need for a secure channel between a server and the storage device. Instead, the updated data is simply released for downloading over an open (i.e., non-secure) channel. The updated data is associated with a digital signature that can be used by the storage device for verifying the integrity of the data. That is, instead of using a secure channel to ensure that the data is not corrupted en route from a server to the storage device, this embodiment relies upon the storage device to determine whether or not data received over an open channel was tampered with. In this way, the new, signed data is simply released and made available for downloading, thereby avoiding the expense and complexity of establishing a secure channel between a server and every storage device that needs to be updated. These embodiments also use a unique mapping technique to preserve the original data in case the updated data is corrupted.

Figure 2:
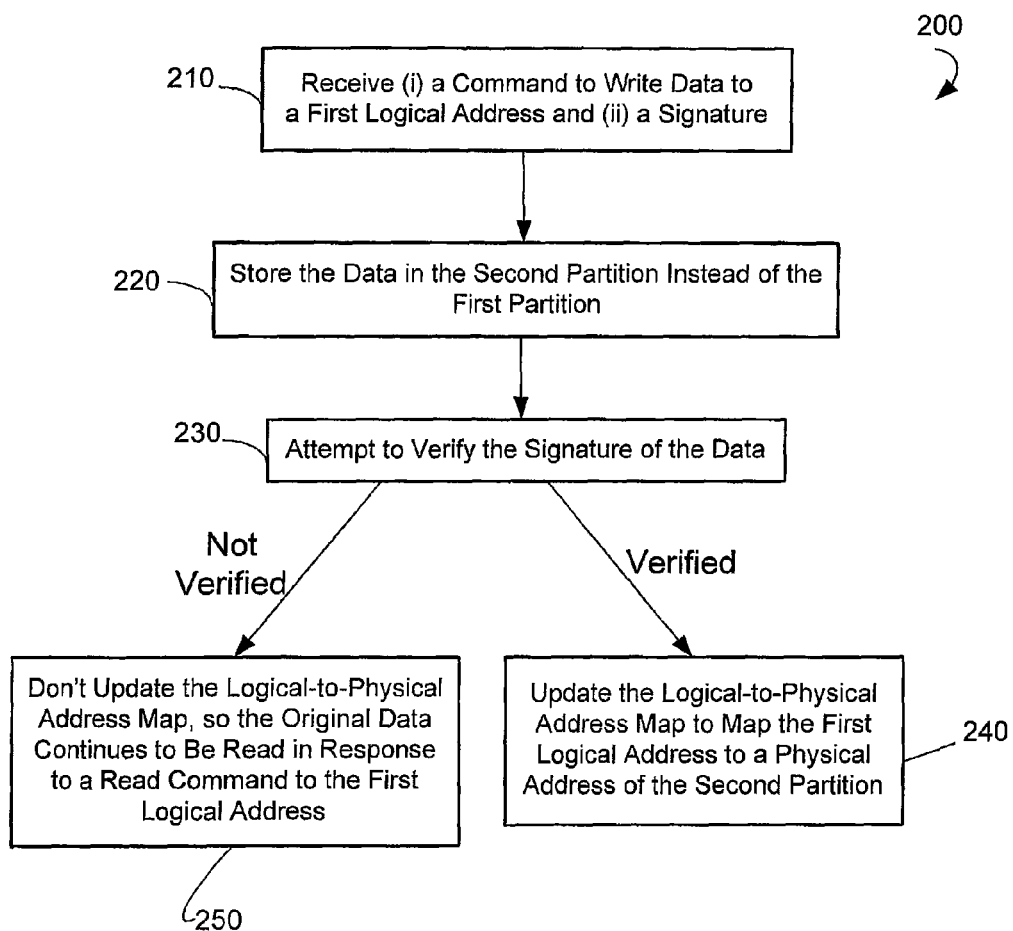
FIG. 2 is a flow chart of a method of an embodiment for updating data stored in a partition of the storage device.

Returning to the drawings, FIG. 2 is a flow chart 200 that illustrates this method in more detail. As shown in FIG. 2, the storage device 110 receives from the host device 100 (i) a command to write updated data to a first logical address and (ii) a signature for verifying integrity of the updated data (act 210). (As used herein, "a command" can be a single command or more than one command. Also, a command does not necessary include an address to a specific partition, as it can include an offset address from the beginning of a partition.) The host device 100 can be made aware of the relevant logical addresses of the storage device 110 as part of the process of mounting the storage device 110 to the host device 100. Alternatively, the relevant logical addresses can be established by the file system running on the host device 100. In any event, the host device 100 believes that the data it needs to update is stored at the first logical address and therefore sends the command to write updated data to that first logical address.

The storage device's logical-to-physical address map 145 shows that the first logical address maps to a physical address of the first partition 164, which stores the original data. (As used here, "original" data refers to data that is to be replaced by updated data. "Original" data is not necessarily data that is provided with the storage device 110. Indeed, as will be discussed below, updated data can be considered "original" data for subsequent updates.) Accordingly, if the storage device 100 followed the logical-to-physical address map 145, the updated data would be written to the first partition 164, thereby overwriting the original data currently stored in the first partition 164. However, because a secure channel was not used to deliver the updated data, it is possible that the updated data could be corrupt, in which case the write operation would overwrite the good data with bad data. To prevent this from happening, instead of following the logical-to-physical address map 145 and writing the updated data to the first partition 164, the storage device 110 writes the updated data to the second partition 166 instead (act 220). As the storage device 110 would normally follow the logical-to-physical address map 145, this special operation of using different mapping can be triggered by a special command sent from the host device 100. That special command can be provided to the host device 100 via the data stored in the first partition 164. The result of this is that the storage device 110 stores two versions of the data: the first partition 164 stores the original data, and the second partition 166 stores the updated data.

Next, the storage device 110 attempts to verify the signature of the updated data (act 230). The source of the updated data (e.g., a server) can create the signature, for example, by applying a hash function to the updated data to generate a hash and then signing the hash using the server's private key. That signature along with a certificate containing the server's public key can be attached to the updated data, or it can be separately provided. Alternatively, the public key of the server can be pre-loaded into the storage device 110 during manufacturing. To attempt to verify the signature, the storage device 110 applies the same hash function to the updated data to generate a hash. The storage device 110 also decrypts the received encrypted signature using the server's public key. The storage device 110 then compares the generated hash to the decrypted hash. The signature is verified if the hashes match.

If the signature is verified successfully, the updated data has not been tampered with and can replace the original data. To do this, the storage device 110 updates the logical-to-physical address map 145 to map the first logical address to a physical address of the second partition 166, which is where the updated data was written to (act 240). That way, the next time the host device 100 reads data from the first logical address, the storage device 110 would read the second partition 166 (because of the new mapping in the logical-to-physical address map 145) and provide the updated data to the host device 110. The first partition 164 would then be available to store a subsequent update using the same processes discussed above.

If the signature is not verified, the storage device 110 takes no action to update the logical-to-physical address map 145 (act 250). Accordingly, the logical-to-physical address map 145 would still map the first logical address to a physical address of the first partition 164, which stores the original data. That way, the next time the host device 100 reads data from the first logical address, the storage device 110 would read the first partition 164 (because of the original mapping in the logical-to-physical address map 145) and provide the original data to the host device 110. The corrupted data stored in the second partition 166 would not be accessible by the host device 100 and can be overwritten with a subsequent update attempt using the same processes discussed above. This technique also provides the advantage of being power-failure immune, as if there is a power failure during the writing of the updated data, the stored original data is still intact.

Figure 3:
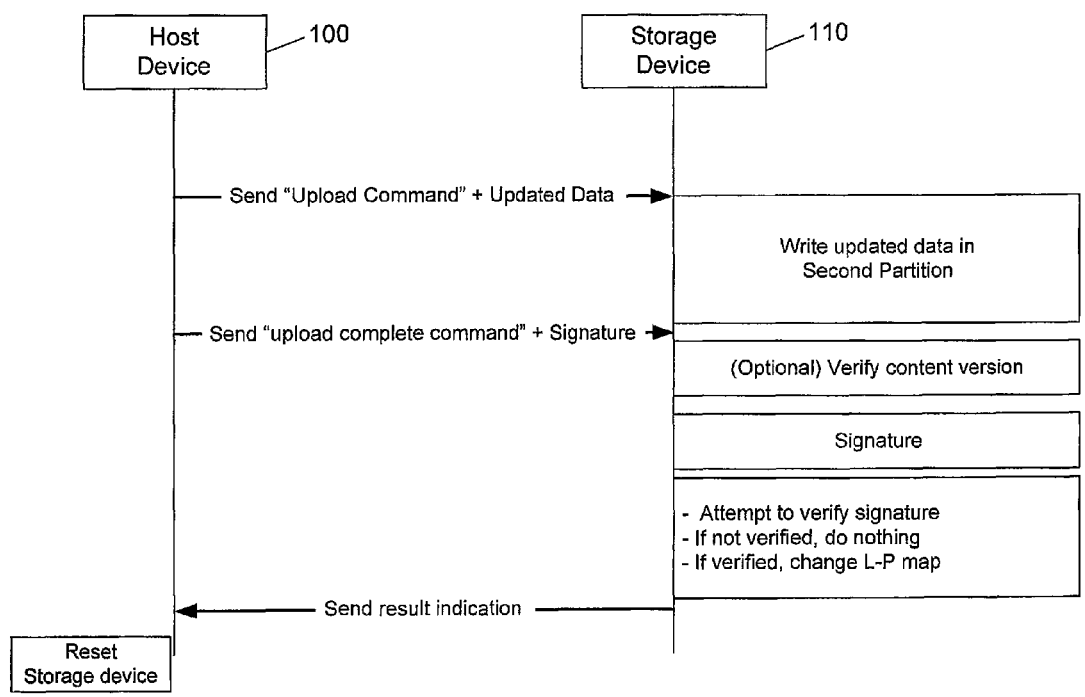
FIG. 3 is an illustration of front end (logical) to back end (physical) mapping of an embodiment.
Figure 4:
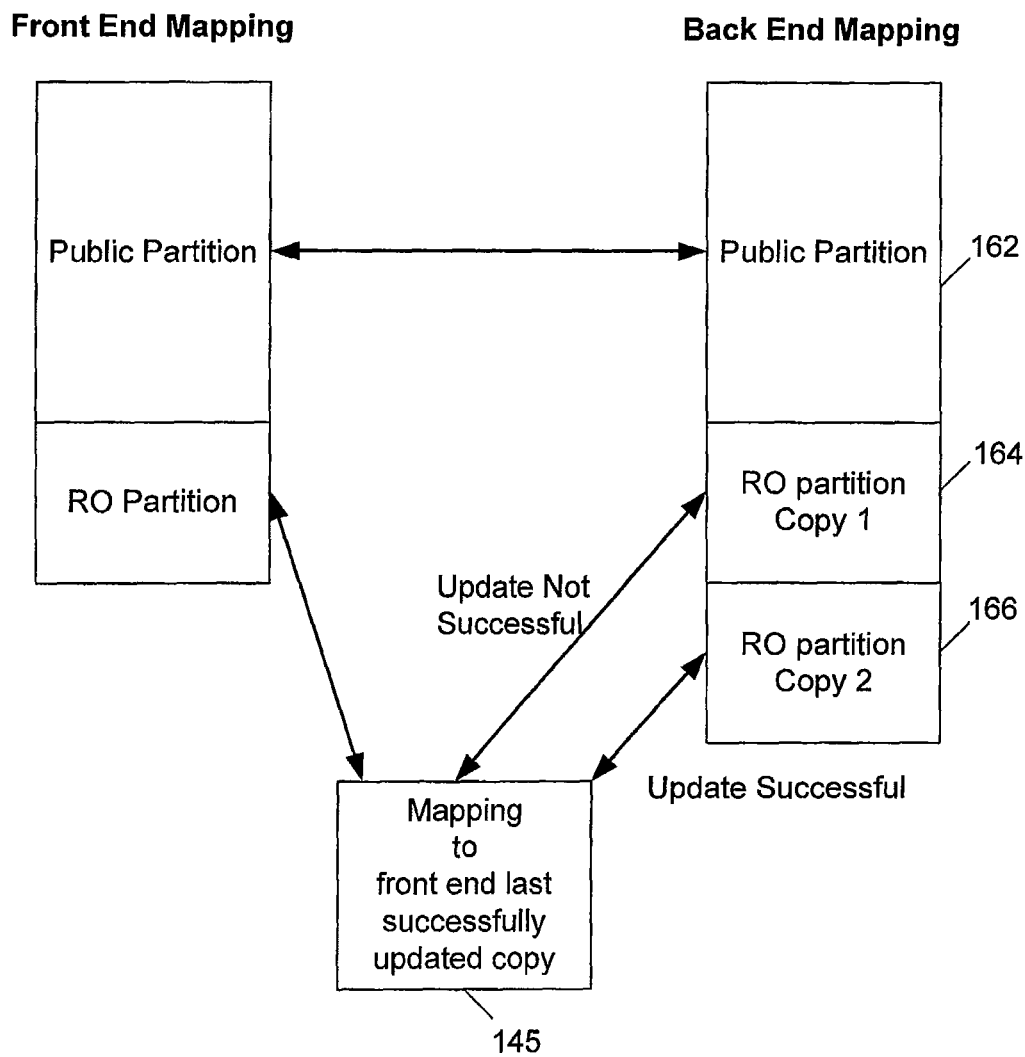
FIG. 4 is a flow diagram illustrating communications between a host device and a storage device of an embodiment.
Figure 5:
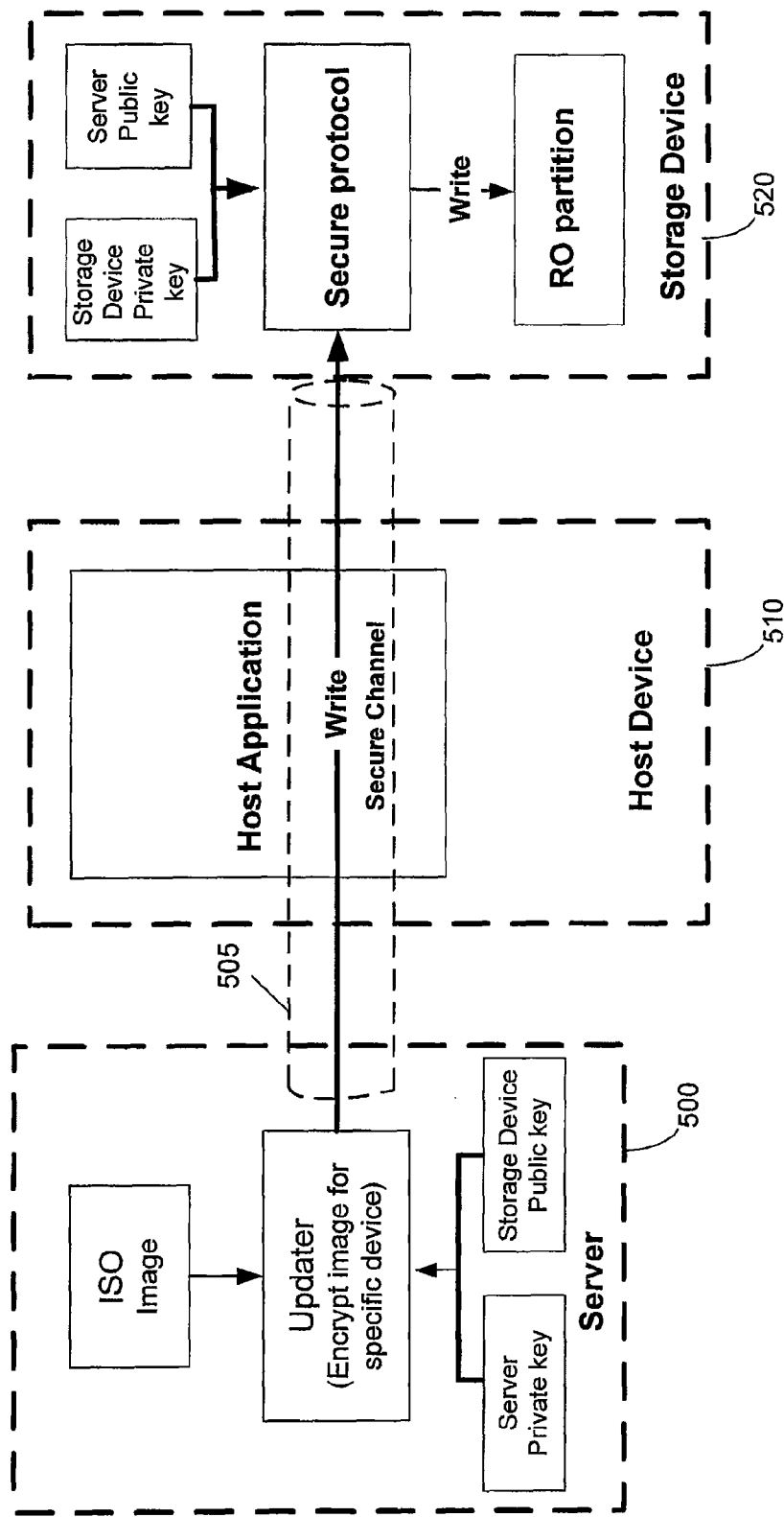
FIG. 5 is an illustration of a prior art technique for updating an application stored in a storage device.

It should be understood that this technique of updating data can be used in any suitable application. In one embodiment, this technique is used to update an application that is stored in the storage device 110 and sent to the host device 100 to allow the host device 100 to communicate with the storage device 110. In order to prevent the application from being tampered with on the storage device 110, the partitions that store the application or its update (e.g., the first and second partitions 164, 166) can be designed as read-only (and also possibly hidden from the host device 100). This embodiment will be discussed in more detail in conjunction with FIGS. 3 and 4.

As shown in these figures, the host device 100 sends a special "upload command" to write updated data to the first logical address. Normally, a command to write data to a given logical address would result in the data being written to the corresponding physical address specified in the logical-to-physical address map 145. However, the storage device's firmware is programmed to respond to the special upload command by writing the updated data in the second read-only partition 166 (that special mapping can also be specified in the logical-to-physical address map 145). This special command also triggers the storage device 110 to "ignore" the read-only restriction on the partition. That is, since the flash memory is a rewritable memory, any given partition of the memory is also rewritable. The storage device's firmware receives commands and decides how to handle them based on the command type and the addresses of the data access. If a "normal" write command is received to the logical address mapped to the first partition 164, the storage device's firmware decides to return an error message without writing the data. It is in this way that the partition is "read only." However, if the storage device's firmware receives the special upload command, it processes the command and writes the data.

After the host device 100 completes the data transfer, the host device 100 sends an "upload complete command" plus the signature to the storage device 110. This triggers an optional step of verifying the content version of the updated data. This would allow the storage device 110 to process the updated data only if a version number of the updated data is more recent than a version number of data stored in the first partition 164. The "upload complete command" also triggers the storage device 110 to attempt to verify the signature to see if the updated data has been tampered with. As discussed above, if the signature is verified, the logical-to-physical address map 145 is updated, so the first logical address points to the second read-only partition 166, which contains the updated data. Otherwise, the logical-to-physical address map 145 is not updated. Finally, the storage device 110 sends a result indication to the host device 100, which triggers a reset of the storage device 110, so the verified, updated application in the second partition 166 can be provided to the host device 100.

When a subsequent update to the data is provided, the above process can be repeated with the data in the second partition being considered the "original" data and the subsequent update being stored in the first partition. In this way, the use of the first and second partitions 164, 166 as the "main" and "scratchpad" partitions toggle back and forth with each subsequent update.

It should be noted that the data in the partitions can take forms other that an application used by the host device 100 to communication with the storage device 110. For example, the data can be audio and/or video data or other forms of user content rendered by the host device 100. In one embodiment, the data is data usable by the host device 100 but not by the storage device 110 (e.g., not storage device firmware).

CONCLUSION

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A method for updating data stored in a partition of a storage device, the method comprising:
performing the following in a storage device containing a logical-to-physical address map and a memory with a first partition storing original data and a second partition:
receiving from a host device (i) a command to write updated data to a first logical address and (ii) a signature for verifying integrity of the updated data, wherein the first logical address is mapped to a physical address of the first partition;
storing the updated data in the second partition instead of the first partition;
attempting to verify the signature of the updated data; and
if the attempt to verify the signature is successful, updating the logical-to-physical address map to map the first logical address to a physical address of the second partition.

2. The method of claim 1, wherein if the attempt to verify the signature is not successful, the logical-to-physical address map is unchanged and continues to map the first logical address to a physical address of the first partition, so that the original data continues to be read in response to a read command to the first logical address.

3. The method of claim 1, wherein the storage device treats the first and second partitions as read-only partitions when the storage device receives a standard write command but treats the first and second partitions as writable partition when the storage device receives a non-standard update command.

4. The method of claim 1, wherein the updated data is received from the host device over a non-secure channel.

5. The method of claim 1, wherein the updated data is stored in the second partition only if the attempt to verify the signature is successful and a version number of the updated data is more recent than a version number of original data stored in the first partition.

6. The method of claim 1, wherein the updated data is usable by the host device but not by the storage device.

7. The method of claim 1, wherein the updated data comprises an application configured to allow the host device to communicate with the storage device.

8. The method of claim 1, wherein the updated data comprises audio and/or video data.

9. The method of claim 1, wherein the storage device comprises a memory card.

10. The method of claim 1, wherein the storage device comprises a universal serial bus (USB) device.

11. The method of claim 1, wherein the first logical address is an address to a specific partition.

12. The method of claim 1, wherein the first logical address is an offset address from a beginning of a partition.

13. The method of claim 1, wherein the storage device comprises a serial advanced technology attachment (SATA) hard drive.

14. A storage device comprising:
an interface configured to communicate with a host device;
a memory containing a first partition storing original data and a second partition; and
a controller in communication with the interface and the memory, wherein the controller is configured to:
receive from a host device (i) a command to write updated data to a first logical address and (ii) a signature for verifying integrity of the updated data, wherein a logical-to-physical address map stored in the storage device maps the first logical address to a physical address of the first partition;
store the updated data in the second partition instead of the first partition;
attempt to verify the signature of the updated data; and
if the attempt to verify the signature is successful, update the logical-to-physical address map to map the first logical address to a physical address of the second partition.

15. The storage device of claim 14, wherein if the attempt to verify the signature is not successful, the logical-to-physical address map is unchanged and continues to map the first logical address to a physical address of the first partition, so that the original data continues to be read in response to a read command to the first logical address.

16. The storage device of claim 14, wherein the storage device treats the first and second partitions as read-only partitions when the storage device receives a standard write command but treats the first and second partitions as writable partition when the storage device receives a non-standard update command.

17. The storage device of claim 14, wherein the updated data is received from the host device over a non-secure channel.

18. The storage device of claim 14, wherein the updated data is stored in the second partition only if the attempt to verify the signature is successful and if a version number of the updated data is more recent than a version number of original data stored in the first partition.

19. The storage device of claim 14, wherein the updated data is usable by the host device but not by the storage device.

20. The storage device of claim 14, wherein the updated data comprises an application configured to allow the host device to communicate with the storage device.

21. The storage device of claim 14, wherein the updated data comprises audio and/or video data.

22. The storage device of claim 14, wherein the storage device comprises a memory card.

23. The storage device of claim 14, wherein the storage device comprises a universal serial bus (USB) device.

24. The storage device of claim 14, wherein the first logical address is an address to a specific partition.

25. The storage device of claim 14, wherein the first logical address is an offset address from a beginning of a partition.

26. The storage device of claim 14, wherein the storage device comprises a serial advanced technology attachment (SATA) hard drive.

* * * * *